United States Patent [19]

Hagiya et al.

[11] 3,945,754
[45] Mar. 23, 1976

[54] HYDRAULIC MACHINES AND OPERATING METHOD THEREOF

[75] Inventors: Keiichi Hagiya; Mamoru Maki; Hiroshi Ogawa; Takeo Hachiya; Kiyozo Ochiai, all of Hitachi, Japan

[73] Assignee: Hitachi, Ltd., Tokyo, Japan

[22] Filed: Aug. 5, 1974

[21] Appl. No.: 494,901

[30] Foreign Application Priority Data
Aug. 6, 1973 Japan.............................. 48-87466

[52] U.S. Cl. ...................................... 415/1; 415/24
[51] Int. Cl.² ............................................ F01D 17/00
[58] Field of Search ................................. 415/1, 24

[56] References Cited
UNITED STATES PATENTS

| | | | |
|---|---|---|---|
| 2,510,190 | 6/1950 | Nicolette | 415/24 |
| 2,649,051 | 8/1953 | Ericson | 415/24 |
| 3,237,565 | 3/1966 | Hartland | 415/1 |
| 3,238,534 | 3/1966 | Hartland | 415/1 |
| 3,658,436 | 4/1972 | Oishi et al. | 415/1 |

Primary Examiner—C. J. Husar
Attorney, Agent, or Firm—Thomas E. Beall, Jr.

[57] ABSTRACT

A hydraulic machine, such as a reversible pump-turbine, is provided with an automatic air vent valve disposed in the casing area and a conduit having a valve for providing direct fluid communication between the casing area and the draft tube, in addition to compressed air means for depressing the water level within the draft tube below the runner, when the guide vanes are closed so that the runner may be rotated substantially only within air. When the runner of the hydraulic machine is rotating within the compressed air that depresses the water level and the draft tube out of the runner chamber and below the runner, water from the draft tube is fed through the valved conduit directly to the casing area, between the inlet valve and the closed guide vanes, to make up for water leaking from the side gaps of the closed guide vanes, with the conduit feed valve being open; at the same time, compressed air that leads through the side gaps of the guide vanes from the runner chamber into the casing is vented out of the casing through the automatic air vent valve.

5 Claims, 1 Drawing Figure

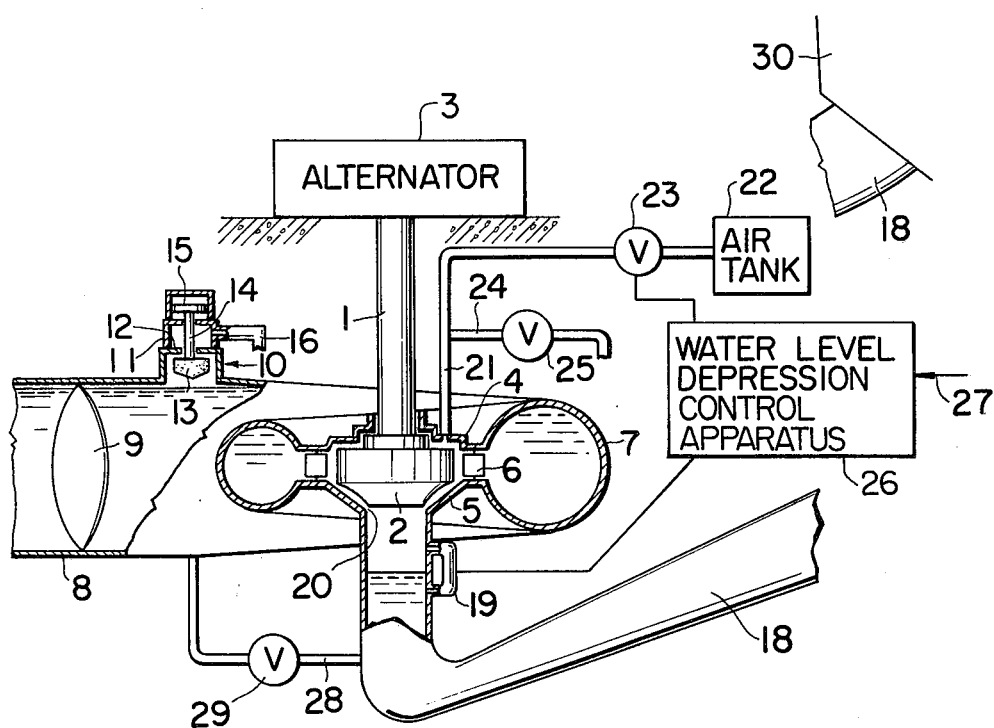

HYDRAULIC MACHINES AND OPERATING METHOD THEREOF

BACKGROUND OF THE INVENTION

The present invention relates to hydraulic machines, such as water turbines, pumps and reversible pump-turbines, and particularly to the method of operating a hydraulic machine when it is desired to have the runner rotated within compressed air, which compressed air will depress the water level within the draft tube so that the runner chamber will be filled with compressed air, when the guide vanes are closed.

In operations such as condenser operation, turning reserve operation and starting operation as a pump, the runner of the hydraulic machine is rotated within compressed air filling the runner chamber. In order to prevent heat elevation due to idling of the runner, it has been thought that a large quantity of cooling water must be fed between the rotating portion and the stationary portion of the hydraulic machine during such operation. In order to feed this large quantity of cooling water between such portions by leaking a large quantity of water from the side gaps of the guide vanes, the water pressure within the casing of the hydraulic turbine has heretofore been maintained at a value much larger than the pressure of the air introduced into the runner chamber, and a feed pipe has been provided to supply the cooling water. At the same time, in order to prevent air admission into the casing during the depression of the water level with compressed air within the runner chamber, the hydraulic machine has been provided with a water feed pump or a bypass with a valve between the upper and lower reaches of the penstock, with respect to the inlet valve within the penstock.

Such large quantities of water supplied to the peripheral portion of the runner brings about a cooling effect, however at the same time, it also generates a large quantity of heat due to the torque loss resulting from such a large quantity of water engaging the runner; therefore, adjustment of the quantity of water supplied has become more difficult as the peripheral velocity of the runner becomes larger, based upon a higher head and larger capacity of the machine. Furthermore, due to such a large torque loss related to the large quantity of cooling water, it has been necessary to provide such a hydraulic machine with a starting motor that has a very large output.

SUMMARY OF THE INVENTION

It is an object of the present invention to effectively cool a rotating portion, such as a runner, of a hydraulic machine, particularly during rotating reserve operation or condenser operation without high torque losses.

It is a further object of the present invention to provide such a hydraulic machine that is able to start with effective cooling, without requiring an unduly large output motor for driving it.

As a part of the present invention, it has been discovered that as the quantity of cooling water supplied to the runner decreases beyond a certain value, the temperature elevation of the runner owing to rotation of the runner within the runner chamber basically filled with compressed air sharply decreases contrary to conventional thinking. According to the present invention, the hydraulic machine is operated with a water pressure in the casing that is substantially equal to the pressure of the air introduced into the runner chamber in order to depress the water level within the draft tube or runner chamber below the lowest portion of the runner. Under such conditions, the cooling is effective without high torque losses during condenser running and reserve running, and further the torque requirements of the starter motor during pump starting are not high. Air that leaks into the casing is removed by an automatic air vent valve to prevent the filling of the casing with air between the penstock inlet valve and the closed guide vanes, and further the water that leaks through the closed guide vanes for cooling purposes is made up within the casing by a conduit directly fluid connecting the draft tube with the casing, with a valve in this conduit that may be shut at other times.

BRIEF DESCRIPTION OF THE DRAWING

Further objects, features and advantages of the present invention will become more clear from the following detailed description of a preferred embodiment with reference made to the accompanying drawing, wherein; the single FIGURE of the drawing is a cross-sectional front veiw of the preferred embodiment, with portions shown schematically.

DETAILED DESCRIPTION OF THE PREFERRED EMBODIMENT

Referring to the accompanying drawing, a reversible pumpturbine of a preferred embodiment of the present invention will be described hereinafter in detail.

The main shaft 1 is disposed substantially vertically, and provided with a runner 2 at its lower end and an alternator 3, such a motor-generator, at its upper end. The runner 2 is disposed in a runner chamber 20, which chamber is defined by an upper cover plate 4, a lower cover plate 5, and a plurality of guide vanes 6. The guide vanes 6 are arranged in an annular array around the runner, with each being pivotally mounted to the upper cover plate 4 and the lower cover plate 5 so that the side gaps of the guide vanes may be adjusted in a conventional manner, between a fully opened position and a generally fully closed position. The upper cover 4 and the lower cover 5 are secured to a casing 7, which is fluid connected directly to a penstock 8, which has an inlet valve 9.

According to the present invention, an automatic air vent valve 10 is provided within the casing 7 or adjacent portion of the penstock 8 between the inlet valve 9 and the guide vanes 6, which valve 10 is preferably a float valve. The automatic air vent valve 10 includes a valve casing 11, a valve seat 12 secured to the valve casing 11, an air vent pipe 16 secured to the valve casing 11, and a float 13 having a weight 15 connected to the float by means of a rod 14 so as to be slidably disposed within the valve casing 11. The weight 15, through the action of the rod 14, will bias the valve 13 in the open position where it will vent air from the casing through the vent pipe 16 to the environment, and when the water level rises within the valve casing 11, the float 13 will move upwardly against the bias of the weight 15 to sealingly engage the valve seat 12 and prevent the escape of the water through the vent pipe 16.

The upper cover plate 4 is provided with an air conduit 21, which is connected with a compressed air tank 22. The passage of air from the compressed air tank 22 through the pipe 21 to the runner chamber is under the control of an air supply valve 23 that is located in the line 21 between the upper cover plate 4 and the air tank 22. Further, an air discharge conduit 24 leading to the environment has an air discharge valve 25 and opens into the conduit 21 between the upper cover plate 4 and the air supply valve 23. The lower cover plate 5 is fluid connected to the draft tube 18, which leads to a lower reservoir 30. The draft tube 18, is provided with a water level detector 19, which produces an electrical signal corelated to the water level, which signal is fed to the water-level depression control apparatus 26. In response to an input signal 27 and the water level signal from the detector 19, the water-level depression control apparatus 26 will control the position of the air valve 23, with respect to its open, closed and intermediate positions.

A conduit 28, with a feed valve 29 therein, is directly connected between the casing 7 at one end thereof and the draft tube 18 at the other end. With the feed valve 29 open, the conduit 28 will conduct water from the draft tube 18 to the casing between the closed inlet valve 9 and the closed guide vanes 6 so as to provide water to take the place of the water that will leak into the runner chamber through the guide vanes 6. While the conduit is shown connected to the draft tube 18, it is understood that it may also be connected to the lower reservoir 30 as a full equivalent.

The operation of the embodiment shown in the drawing with respect to the starting of pump operation or condenser operation, for a reversible pump-turbine, is as follows.

Both of the guide vanes 6 and the inlet valve 9 are fully closed. Thereafter, compressed air from the compressed air tank 22 is supplied into the runner chamber 20 through the conduit 21 by opening the air supply valve 23 and fully closing the air discharge valve 25, all under control of the water-level depression control apparatus 26. The thus supplied compressed air will depress the water level in the runner chamber 20 to a predetermined level in the draft tube 18, which level is the same as the level in a conventional reversible pumpturbine under similar operation conditions. The thus depressed water level is detected by the water-level detector 19 that supplies a corelated signal to the control apparatus 26, so that the control apparatus 26 will maintain the depressed water level at the predetermined level by adjusting the quantity of compressed air through adjustment of the air supply valve 23.

At the same time that the water level is being depressed, the feed valve 29 is opened to provide make up water for water leakage from the side gaps of the closed guide vanes 6 with water supplied from the draft tube 18 to the casing 7. Thereby, the pressure of the water within the casing 7 between the inlet valve 9 and the closed guide vanes 6 will become substantially equal to the pressure of the compressed air within the runner chamber 20, which will result in a relatively small quantity of water leaking through the side gaps of the closed guide vanes 6. It has been found according to the present invention, that such relatively small quantity of water leakage is sufficient to cool the relatively moving parts.

The compressed air within the runner chamber 20 that leaks through the side gaps of the closed guide vanes 6 will tend to collect in the upper portion of the casing 7, where it will be vented through the automatic air vent valve 10. When the collected air has been vented from the casing 7 and the valve casing 11 starts to fill with water, the float 13 will move upwardly in sealing contact with the valve seat 12, to thus close the automatic air vent valve 10 so that water will not pass from the casing through the vent pipe 16.

When the water level within the draft tube 18 reaches a predetermined desired level, a motor (not shown) that is used for starting and which is connected to the generator-motor 3, will start to rotate the runner 2. When the runner 2 has reached the rated r.p.m. and synchronization has resulted, the pump-turbine is ready for starting of the pump operation with the generator-motor 3 pulled into parallel operation. It is seen that during such start-up the runner will basically be started in compressed air and the leakage water, which according to the present invention has been found to be sufficient for cooling purposes, is relatively small in quantity so that the leakage water does not place high torque demands upon the starting motor (not shown), which is a significant difference with respect to the prior art. At this time, the starting of pump operation may be instructed so that the feed valve 29 is fully closed and the inlet valve 9 is fully opened. Thereby, water pressure within the casing 7 becomes equal to that within the penstock 8. Afterwards, the air discharge valve 25 is opened and the air supply valve 23 closed fully for discharging the compressed air from the runner chamber. After the compressed air has been discharged from the runner chamber, the guide vanes 6 are gradually opened to go into pump operation.

In the event that it is desired to shift from condenser operation to power generation operation, the generator-motor is idled in the direction of power generation without generation of any power. With a suitable instruction for starting of the power generation, the feed valve 29 is fully closed, the inlet valve 9 is fully opened, the air supply valve 23 is fully closed by the water level depression control apparatus 26, and the guide vanes 6 are gradually opened to go into power generation operation as the compressed air surrounding the runner 2 is discharged into the draft tube 18.

In the event that it is desired to shift from power generation operation to condenser operation, full closure of the guide vanes 6, full opening of the inlet valve 9, full opening of the feed valve 29 and start of water level depression are performed in turn.

As the pump-turbine according to the present invention is constructed so that water leakage from the side gaps of the guide vanes 6 is minimized during spinning or running of the runner in the compressed air, cooling water in addition to the water leakage is not supplied. The temperature elevation at the peripheral portion of the runner 2 is greatly decreased.

The present invention is preferably used and most effective when employed with hydraulic machines for high speed operation and high head (more than 300m).

The results of experimental usage with a pump turbine having a head of 500m, 375 r.p.m., and an output of 23,00 kw are as follows:

First with respect to conventional operation.
    Torque loss in a generator motor side= A : 4720 kw
    Torque loss in the pump-trubine side= B : 14,000 kw
    Total output necessary for driving the hydraulic machine=C : 18720 kw
    Temperature elevation= D : 55° C Now with operation according to the present invention, A : 4720 kw B : 2500 kw C : 7220 kw

D : 5° C

According to the above experimental results, it is seen that the hydraulic machine can be driven according to the present invention with a motor specifically used for such driving of the runner in a runner chamber basically filled with compressed air, which motor has a much smaller output than heretofore used in conventional operation.

While a preferred embodiment of the present invention has been disclosed in detail, with the details being important, further embodiments, variations and modifications are contemplated, all as defined by the spirit and scope of the following claims.

We claim:

1. A method of operating a hydraulic machine having a draft tube leading to a runner within a chamber and a penstock with an inlet valve leading to a casing that is separated from the runner by a plurality of guide vanes, comprising the steps of: closing the inlet valve; closing the plurality of guide vanes; introducing a compressed gas into the runner chamber defined by the closed guide vanes to depress the water level in the runner chamber to a level below the lower portion of the runner while said inlet valve remains closed; substantially equalizing the water pressure in the casing between the closed guide vanes and the closed inlet valve with the gas pressure surrounding the runner within the runner chamber by feeding water from the draft tube into the casing without passing through the runner, and further by automatically venting, to the outside of the casing, only gas that has leaked into the casing from the runner chamber through the closed guide vanes; and rotating the runner in the compressed gas within the runner chamber.

2. A hydraulic machine comprising: a chamber; a rotatbly mounted runner within said chamber; a penstock for connection with an upper reservoir of water; an inlet valve within said penstock to control the flow of water within the penstock; a casing fluid connected between the penstock and said runner; a plurality of guide vanes mounted for opening and closing within said casing around said runner for controlling the quantity of water passing between the runner and the casing; a draft tube fluid connected to the runner opposte from the guide vanes for connection to a lower reservoir of water; first means for introducing compressed gas within the guide vanes to the runner for depressing the level of water normally surrounding the runner to a level below the runner when the guide vanes are closed; and second means for substantially equalizing the water pressure in the casing outside of the closed guide vanes with the pressure of the gas surrounding the runner, with the inlet valve closed; and said second means comprising fluid passage means for supplying water from the draft tube into the casing outside of the guide vanes, with said fluid passage means bypassing the guide vanes and runner, and further comprising means for automatically venting to the outside of the casing only gas that has leaked into the casing from the runner chamber through the closed guide vanes.

3. The hydraulic machine as defined in claim 2, wherein said means for supplying water comprises a conduit having one end fluid connected with the casing and its opposite end fluid connected with the draft tube, and a valve fluid interposed within said conduit between said opposite ends.

4. The hydraulic machine as defined in claim 3, wherein said means for venting gas comprises a float valve that will freely pass gas and that will close in response to the presence of water.

5. The hydraulic machine as defined in claim 2, wherein said means for venting gas comprises a float valve that will freely pass gas and that will close in response to the presence of water.

* * * * *